Jan. 23, 1962 D. E. CAIN 3,018,125
FLEXIBLE LINK ASSEMBLY FOR TRANSMITTING LINEAR MOTION
Filed Sept. 30, 1959
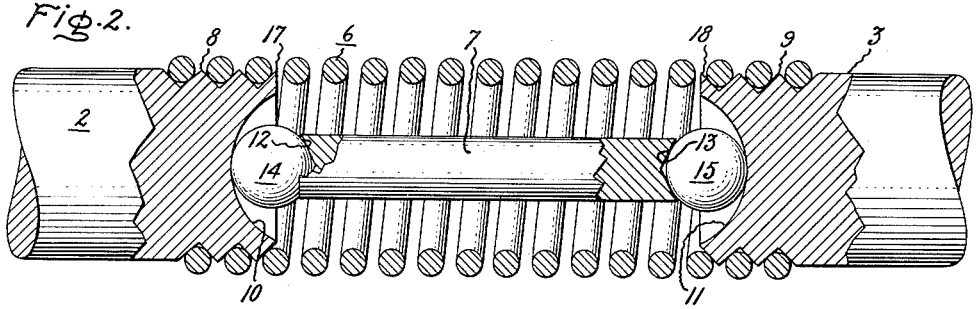
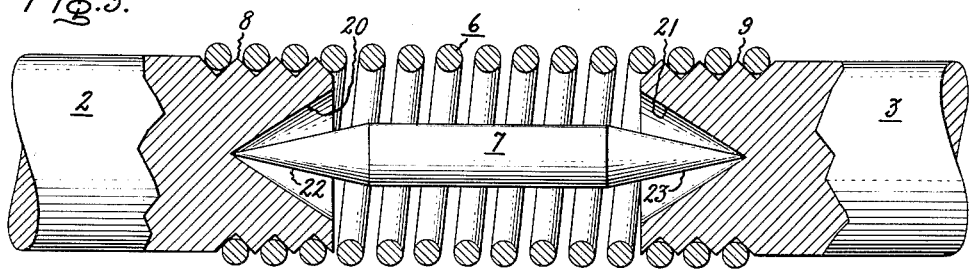
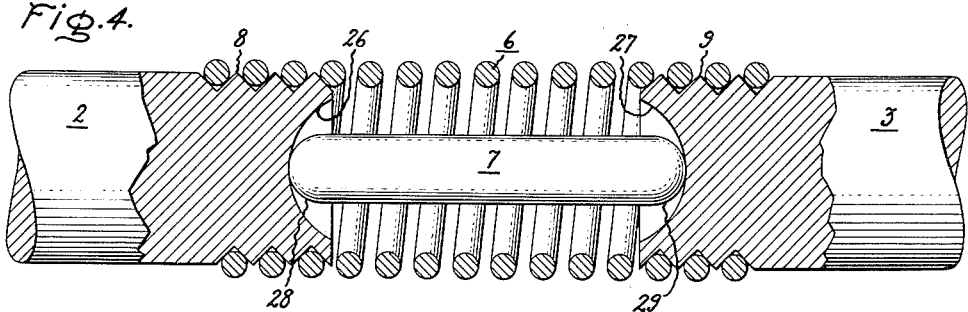
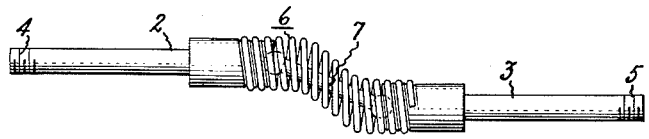
Inventor
Dallas E. Cain
by Paul A. Frank
His Attorney United States Patent Office 3,018,125
Patented Jan. 23, 1962

3,018,125
FLEXIBLE LINK ASSEMBLY FOR TRANSMITTING LINEAR MOTION
Dallas E. Cain, Scotia, N.Y., assignor to General Electric Company, a corporation of New York
Filed Sept. 30, 1959, Ser. No. 843,541
12 Claims. (Cl. 287—86)

This invention relates to flexible links, and more particularly, to flexible links for transmitting linear motion.

In precision controls for hydraulic and pneumatic systems it is essential that mechanically actuated members, such as valves, be actuated with a minimum amount of friction and lost motion. To achieve these objectives, great precision is required in the manufacture of such controls. In certain types of controls, where the cost of such precision is not justified, flexible links are utilized to compensate for any angular or axial misalignment between the points connected by a link. These links usually comprise joint connections and springs. Tension forces are usually transmitted through a spring which is suitably tensed and compressive forces are transmitted through suitable joint connections. It is desirable that substantially no lost motion be experienced during tension of such a link and that minimum friction and side forces are experienced during the transmission of compressive forces through the link.

The chief object of the present invention is to provide an improved flexible link capable of accommodating angular and axial misalignment of points connected by the link.

Another object is to provide an improved flexible link which achieves minimal friction losses while transmitting forces by avoiding sliding friction between elements of the link.

A still further object is to provide a flexible link having improved spring mounting means for the tension spring utilized as a portion of the flexible link.

These and other objects of my invention will become more apparent from the following description.

One of the features of the present invention is a flexible link including a pair of members connected by a tension spring and separated by a suitable pin which is connected to the members by means of suitable joint connections. The joint connections comprise a cup into which a surface extends having substantially the same geometric contour as the cup, the contour of the cup being substantially larger than the contour of the surface with the result that only a small portion of the surface engages the contour of the cup at a given time.

The invention will be more clearly understood from the detailed description of preferred embodiments described in the accompanying drawings, in which FIGURE 1 is a view of the link showing axial misalignment of portions of the link;

FIGURE 2 is an enlarged sectional view of the center portion of the link;

FIGURE 3 is an enlarged sectional view of the center portion of another embodiment of the present invention, and FIGURE 4 is an enlarged sectional view of a third embodiment of the invention.

In FIGURE 1 there is shown a flexible link comprising a pair of members 2 and 3 which are parallel but eccentric, the eccentricity being exaggerated for the purposes of illustration. First member 2 has a threaded end 4 which is adapted to be connected to a suitable source of reciprocating motion. Second member 3 has a threaded end 5 adapted to be connected to a member to be suitably reciprocated in response to the force applied to first member 2. The first and second members are connected by a suitable spring 6 and the members are capable of transmitting compressive forces through pin 7.

FIGURE 2 shows an enlarged sectional view of the center portion of the flexible link shown in FIGURE 1. First member 2 has a threaded portion 8. The end of the first member is provided with a cup or recess 10. Similarly, second member 3 is provided with suitable threads 9 and the end of the second member is provided with a suitable recess or cup 11. In this embodiment recesses 10 and 11 have the shape of a segment of a sphere.

In order to transmit motion from member 2, I provide a spherical member 14 adapted to protrude into recess 10. The arc of member 14, which contacts the surface of recess 10, is substantially smaller than the spherical surface of the recess. This relationship is duplicated with respect to the recess 11 into which the spherical member 15 protrudes. Spherical members 14 and 15 are maintained in recesses 10 and 11 respectively by means of pin 7 which has recessed ends 12 and 13 adapted to engage the spherical members.

Spring 6 is suitably tensioned to urge the members 2 and 3 toward each other. This tension or bias is restrained by the action of the recessed surfaces 10 and 11 against spherical members 14 and 15 which are fitted into the ends of pin 7.

I provide a uniform pitch in spring 6, both at its center tensioned portion and also at its ends where it engages threads 8 and 9. Before my invention it was common practice for the turns in the center portion of such a spring to be widely spaced and the turns at the ends where the spring engaged coupling threads to be extremely closely spaced and have a lesser pitch than in the center portion. As a result only the center portion of the spring was stressed and the entire reaction force from the tensed portion of the spring was borne by the first threads of the joined members. Thus in a connection similar to that shown in FIGURE 2, before my invention the entire reaction force was absorbed by the surface 17 since the turn of the coupling spring adjacent thereto was subject to deflection as it left the first member and entered the unsupported condition existing in the center of the spring. Similarly, on the second member the surface 18 similarly bore the reaction force of the spring. It is apparent that in such prior structures the extreme ends of the spring were not subject to any stresses from the tension of the spring. As a result in the prior art there was a tendency for the wire or spring turns adjacent surfaces 17 and 18 to ride over the threads with the result that the link could not react properly and perform its intended use. Another disadvantage encountered as a result of the unequal stressing of the spring is that the change in pitch in the spring turns causes a bending of the spring helix axis. This bending has an adverse effect on the operation of the link.

In the present invention as shown in FIGURE 2, the threads 8 and 9 are of a pitch such that the adjacent turns mounted on the first and second members have the same spacing as the center turns of the spring. As a result, upon assembly of the link, the entire length of wire is uniformally stressed and reaction forces transmitted to the first and second members from the spring are uniformally distributed over the threaded surfaces, thereby, substantially obviating the localized stresses encountered in the prior art at the surfaces 17 and 18.

In order to minimize friction losses during operation of the flexible link, the preferred embodiment shown in FIGURE 2 avoids sliding friction which is normally the cause of unsatisfactory operation of previously known devices and substitutes rolling friction in such a manner that the friction losses encounted in the operation of the link are extremely small and do not impede the successful operation of the control.

To achieve rolling contact the spherical surfaces 10 and 11 have substantially greater radii than members 14 and 15. As a result, upon angular or axial misalignments between the first and second members the members 14 and 15 tend to roll on the surfaces of recesses 10 and 11. The amount of permissible misalignment is determined by both the relationship between the radii of the arcuate surfaces 10 and 11 of the recesses and spherical members 14 and 15 and the co-efficient of friction between the materials of the spherical members and the surface material of recesses 10 and 11.

In operation, tension forces transmitted through the flexible link are passed from the first member through spring 6 to the second member. Compression forces are transmitted from the first member through spherical member 14, through pin 7, to spherical member 15, which transmits the forces to second member 3. It will be appreciated that the magnitude of tensive forces transmitted depends on the stiffness of spring 6. The magnitude of compressive forces which may be transmitted depends on the strength of the members and the pin and also the point where the joints permit the link to buckle under the load.

FIGURE 3 discloses a second embodiment of the present invention in which members 2 and 3 and the orientation of spring 6 are substantially the same as illustrated in FIGURE 2. Recess 20 in first member 2 and recess 21 in second member 3 both have a conical shape. The ends of pin 7 terminate in conical surfaces 22 and 23, apex of conical surface 22 engaging the apex of conical surface 20 and the apex of conical surface 23 engaging the apex of conical surface 21. The angles of the conical surfaces 22 and 23, however, are substantially smaller than the angles of conical surfaces 20 and 21. By this construction, point contact is substantially achieved between pin 7 and the first and second members. The apices of cones 22, 23 may be suitably hardened, and if desired, jeweled tips may be provided to minimize friction.

In the operation of the embodiment of FIGURE 3, tension forces are transmitted through the spring substantially in the same manner as in the embodiment shown in FIGURE 2. Compression forces are transmitted from the first member through the apices of the previously described cones through the pin to the second member. Point bearing surfaces are provided to minimize frictional losses.

A third embodiment of the present invention, shown in FIGURE 4, functions substantially in the same manner as the embodiment shown in FIGURE 2. The first and second members 2, 3 and spring 6 are substantially identical. However, pin 7 is provided with rounded terminal surfaces 28 and 29 which engage spherical surfaces 26 and 27 of the first and second members 2 and 3, respectively. In this embodiment the spherical surfaces provided by spherical members 14 and 15 of FIGURE 2 are incorporated in unitary pin 7. Rolling engagement by spherical surfaces 28 and 29 against the surfaces 26 and 27 is similar to that experienced during operation of embodiment in FIGURE 2.

From the foregoing it is apparent that the present invention provides a flexible link construction wherein tension forces are transmitted through a uniformally stressed spring and compression forces are transmitted through joint connections wherein rolling engagement or point bearing engagement is achieved to minimize friction losses. The tension spring further acts to maintain the elements of the link in a pre-loaded condition with respect to one another to avoid any lost motion between the elements when compression forces are transmitted. It will be appreciated that if desired the present invention may also be practiced by placing the recesses in the pin and placing the engaging surfaces on the first and second members.

While there have been described preferred embodiments of the present invention, it will be appreciated that the invention is not limited thereto but that various modifications may be made without departing from the scope of the appended claims.

What I claim as new and desire to secure by Letters Patent of United States is:

1. In a flexible link adapted to transmit linear motion, the combination of a first member, a second member, a tension spring adapted to connect the first and second members, a pin mounted between said first and second members and being disposed in the same general direction as said members, a joint connecting the pin and one of said members, said joint comprising means defining a recess, means defining a surface having substantially the same geometric contour as the recess, the contour of the recess being substantially larger than the contour of the surface whereby only a small portion of the contour of the surface engages the contour of the recess.

2. The link according to claim 1 in which the spring substantially envelops the pin and the joint.

3. The link according to claim 1 in which the recess has a conical shape.

4. The link according to claim 1 in which the recess has the shape of a segment of a sphere.

5. The link according to claim 2 in which each member has a threaded portion adapted to be engaged by the end of the spring, the pitch of the threads being substantially equal to the pitch of the turns of the spring in tension when the link is assembled.

6. In a flexible link adapted to transmit linear motion, the combination of a first member, a second member, a plurality of threads on each member, a tension spring adapted to threadably engage said threads on said members to bias said members toward one another, a pin operatively associated with said members to restrain the bias on said members, each of said members having a recess, means associated with at least one end of said pin which extends into the recess, said means having substantially the same geometric contour as the recess, the contour of the recess being substantially larger than the contour of the means whereby only a small portion of the contour of the means engages the contour of the recess.

7. The link according to claim 6 in which the means has the shape of a segment of a sphere, whereby angular movement of the pin relative to the members causes rolling motion of the means with respect to the surface of the recess.

8. The link according to claim 7 in which the means comprises an end portion of the pin.

9. The link according to claim 7 in which the means comprises a spherical member which engages the pin.

10. The link according to claim 7 in which the threads on each member engaged by the spring has substantially the same pitch as the middle turns of the spring which are stressed to bias the members toward one another when the link is assembled.

11. The link according to claim 6 in which the means has a shape of a cone.

12. The link according to claim 11 in which the cone is a portion of the pin.

References Cited in the file of this patent

UNITED STATES PATENTS

| 1,119,754 | Hodde et al. | Dec. 1, 1914 |
| 1,485,036 | Kingsley | Feb. 26, 1924 |
| 1,719,411 | Weidenbach | July 2, 1929 |
| 1,796,255 | White | Mar. 10, 1931 |
| 2,089,397 | Meyfarth | Aug. 10, 1937 |

FOREIGN PATENTS

| 552,831 | Germany | Apr. 15, 1931 |
| 556,825 | France | Apr. 20, 1923 |

Notice of Adverse Decision in Interference

In Interference No. 93,597 involving Patent No. 3,018,125, D. E. Cain, Flexible link assembly for transmitting linear motion, final judgment adverse to the patentee was rendered Oct. 14, 1964, as to claims 1, 3, 6, 11 and 12.

[*Official Gazette November 24, 1964.*]